US012627356B2

(12) United States Patent
Haghighat et al.

(10) Patent No.: US 12,627,356 B2
(45) Date of Patent: May 12, 2026

(54) PANEL SELECTION FOR UPLINK TRANSMISSION IN A MULTI-TRANSMISSION-RECEPTION POINT (TRP) SYSTEM

(71) Applicant: InterDigital Patent Holdings, Inc., Wilmington, DE (US)

(72) Inventors: Afshin Haghighat, Ile-Bizard (CA); Loic Canonne-Velasquez, Dorval (CA); Moon Il Lee, Melville, NY (US); Prasanna Herath, Laval (CA); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 497 days.

(21) Appl. No.: 17/797,895

(22) PCT Filed: Feb. 16, 2021

(86) PCT No.: PCT/US2021/018210

§ 371 (c)(1),
(2) Date: Aug. 5, 2022

(87) PCT Pub. No.: WO2021/163689

PCT Pub. Date: Aug. 19, 2021

(65) Prior Publication Data

US 2023/0078339 A1 Mar. 16, 2023

Related U.S. Application Data

(60) Provisional application No. 63/091,706, filed on Oct. 14, 2020, provisional application No. 62/976,111, filed on Feb. 13, 2020.

(51) Int. Cl.
*H04B 7/06* (2006.01)
*H04B 7/024* (2017.01)

(52) U.S. Cl.
CPC ......... *H04B 7/06952* (2023.05); *H04B 7/024* (2013.01)

(58) Field of Classification Search
CPC ....... H04B 7/0695; H04B 7/024; H04B 7/088
See application file for complete search history.

(56) References Cited

U.S. PATENT DOCUMENTS 10,736,044 B2 * 8/2020 Ryu ...................... H04W 16/28
2019/0098520 A1 3/2019 Kim
(Continued)

OTHER PUBLICATIONS

Third Generation Partnership Project (3GPP), "Physical Layer Procedures for Data", 3GPP TS 38.214 V16.10.0 (Jun. 2022), Valbonne, France, 174 pages.

*Primary Examiner* — Peter Chen
*Assistant Examiner* — Jia Hao Deng
(74) *Attorney, Agent, or Firm* — Flaster Greenberg, P.C.

(57) ABSTRACT

Apparatuses and methods are disclosed for panel selection for uplink (UL) transmission in a multi-transmission-reception point (TRP) system. A method performed by a wireless transmit/receive unit (WTRU) may include receiving, for each of a plurality of transmit/receive points (TRPs), information for measuring a first set of reference signals and spatial relation information, the spatial relation information associating each of one or more transmit beams with one or more of a second set of reference signals and with physical uplink control channel (PUCCH) resources. The method may include, for each of the plurality of TRPs, measuring a pathloss of each common reference signal among the first and second set of reference signals. The method may include selecting a transmit beam and a TRP and sending a transmission to the selected TRP. The transmit beam may be associated with an antenna panel of the WTRU.

16 Claims, 15 Drawing Sheets

(56) References Cited

U.S. PATENT DOCUMENTS

| | | |
|---|---|---|
| 2019/0123864 A1 | 4/2019 | Zhang et al. |
| 2021/0159966 A1* | 5/2021 | Xi ........................ H04B 7/0691 |

* cited by examiner

Figure 1D:
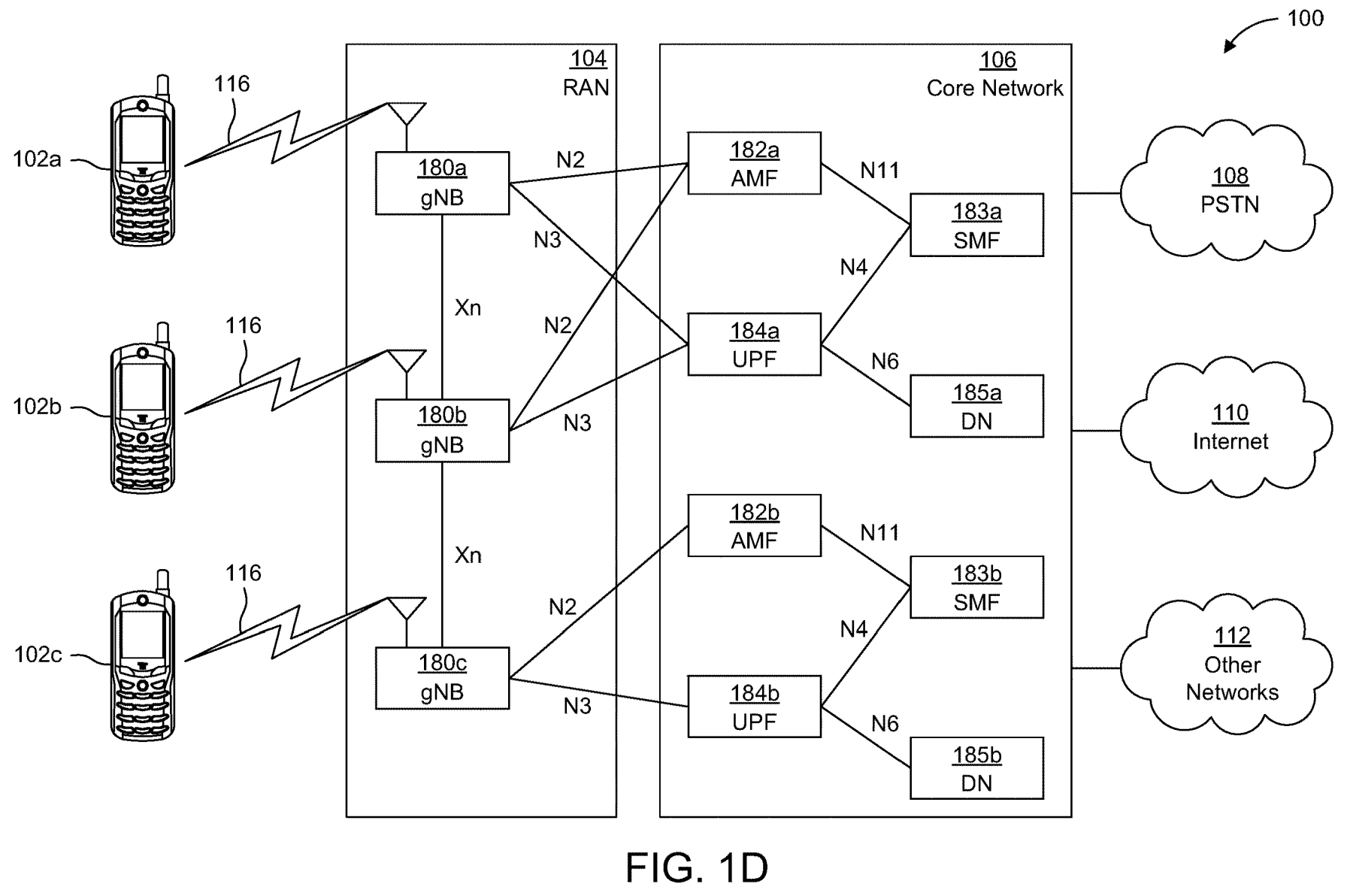

108
PSTN

110
Internet

112
Other
Networks

106
Core Network

183a
SMF

185a
DN

183b
SMF

185b
DN

N11

N4

N6

N11

N4

N6

182a
AMF

184a
UPF

182b
AMF

184b
UPF

104
RAN

N2

N3

N2

N3

N2

N3

180a
gNB

Xn 180b
gNB

Xn 180c
gNB

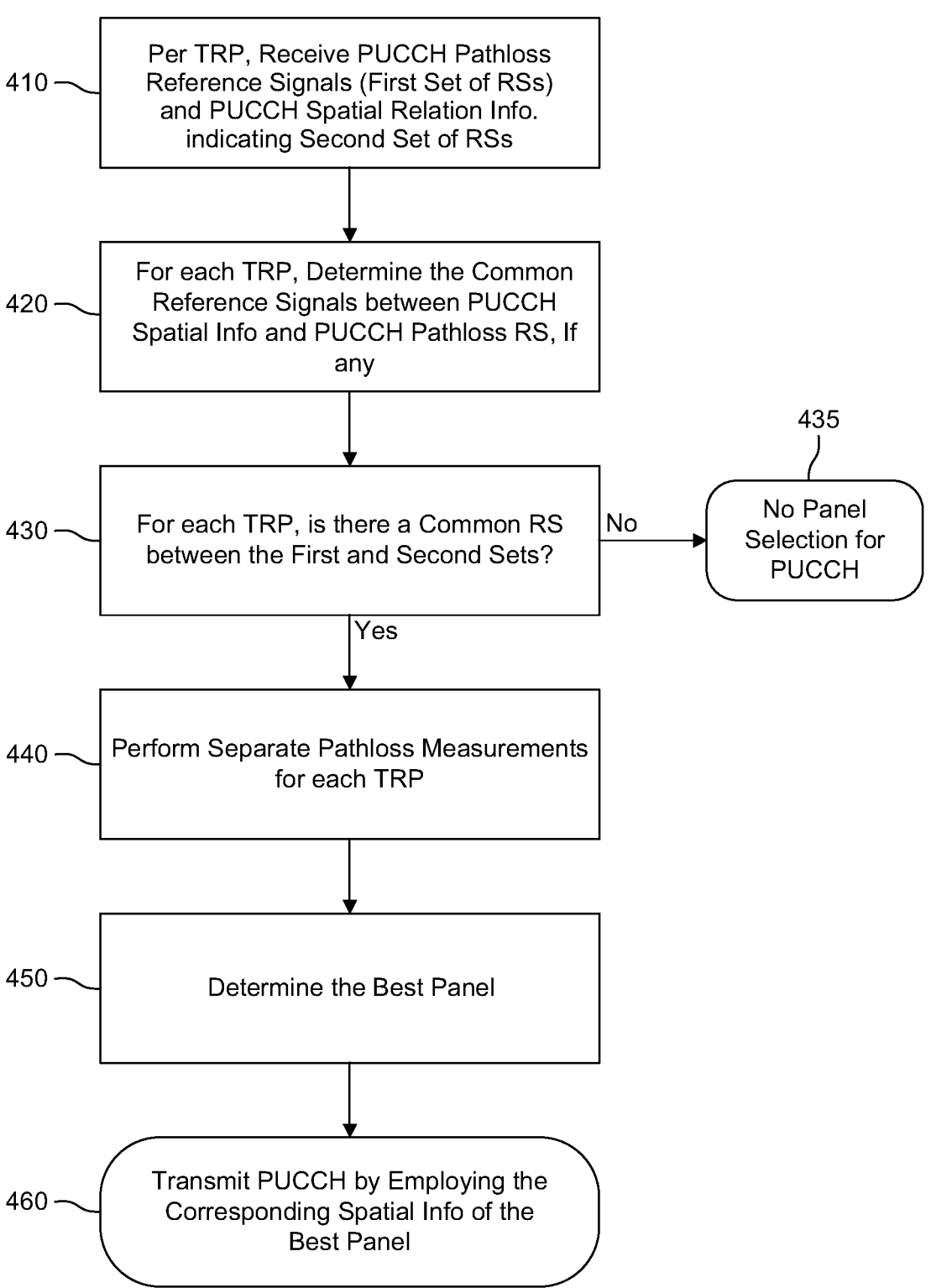

410 — Per TRP, Receive PUCCH Pathloss Reference Signals (First Set of RSs) and PUCCH Spatial Relation Info. indicating Second Set of RSs 420 — For each TRP, Determine the Common Reference Signals between PUCCH Spatial Info and PUCCH Pathloss RS, If any 430 — For each TRP, is there a Common RS between the First and Second Sets?

435
No — No Panel Selection for PUCCH

Yes

440 — Perform Separate Pathloss Measurements for each TRP

450 — Determine the Best Panel

460 — Transmit PUCCH by Employing the Corresponding Spatial Info of the Best Panel

FIG. 4

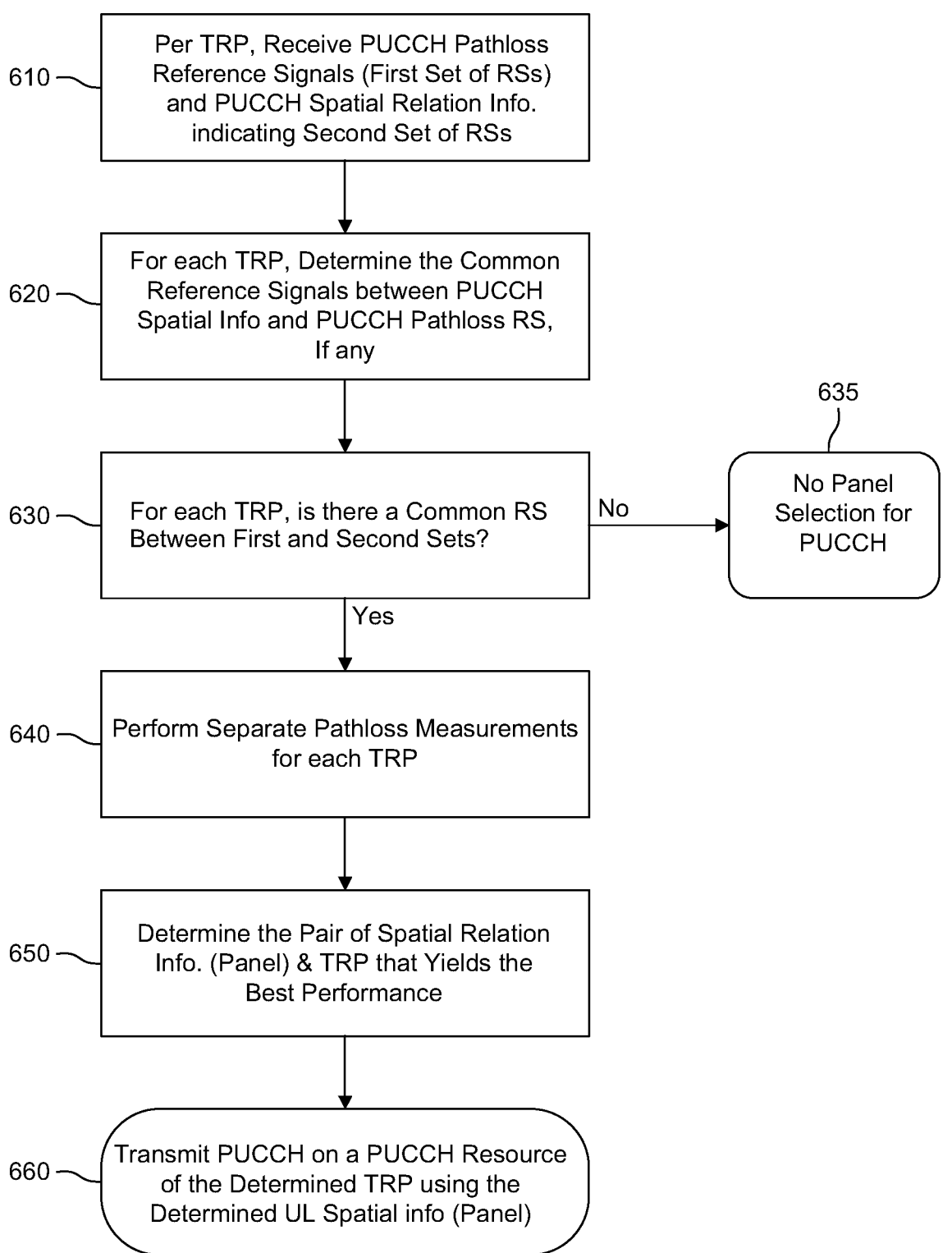

610 — Per TRP, Receive PUCCH Pathloss Reference Signals (First Set of RSs) and PUCCH Spatial Relation Info. indicating Second Set of RSs 620 — For each TRP, Determine the Common Reference Signals between PUCCH Spatial Info and PUCCH Pathloss RS, If any 630 — For each TRP, is there a Common RS Between First and Second Sets?

No → 635 — No Panel Selection for PUCCH

Yes

640 — Perform Separate Pathloss Measurements for each TRP

650 — Determine the Pair of Spatial Relation Info. (Panel) & TRP that Yields the Best Performance 660 — Transmit PUCCH on a PUCCH Resource of the Determined TRP using the Determined UL Spatial info (Panel)

FIG. 6

810 — PUCCH

825

820 — Scrambling ← Panel Specific Identity

830 — PUCCH Scrambled with Panel Specific Sequence

910 — PUCCH

920 — Scrambling

925 — TRP Specific Identity

930 — PUCCH Scrambled with TRP Specific Sequence

1010 — PUCCH

1025

1020 — Scrambling

TRP & Panel Specific Identity

1030 — PUCCH Scrambled with TRP Specific Sequence

PANEL SELECTION FOR UPLINK TRANSMISSION IN A MULTI-TRANSMISSION-RECEPTION POINT (TRP) SYSTEM

CROSS-REFERENCE TO RELATED APPLICATIONS

This application is the 371 National Stage of International Application No. PCT/US2021/018210, filed Feb. 16, 2021, which claims the benefit of U.S. Provisional Application No. 62/976,111, filed Feb. 13, 2020, and U.S. Provisional Application No. 63/091,706, filed Oct. 14, 2020, the contents of which are incorporated herein by reference.

BACKGROUND

In New Radio (NR) wireless communications, operation with multiple base stations or transmission-reception points (TRPs) is supported. Specifically, in NR, multi-TRP (MTRP) operation is supported with the initial focus on downlink transmission.

As such, an NR wireless transmit/receive unit (WTRU) can receive and process multiple NR-physical downlink control channels (NR-PDCCHs) and NR-physical downlink shared channels (NR-PDSCHs). Further, NR supports MTRP transmission for a downlink shared data channel for enhanced massive mobile broadband (eMBB) and ultra-reliable low latency communications (URLLC) scenarios.

SUMMARY

Apparatuses and methods are disclosed for panel selection for uplink (UL) transmission in a multi-transmission-reception point (TRP) system. A method performed by a wireless transmit/receive unit (WTRU) may include receiving, for each of a plurality of transmit/receive points (TRPs), information for measuring a first set of reference signals and spatial relation information, the spatial relation information associating each of one or more transmit beams with one or more of a second set of reference signals and with physical uplink control channel (PUCCH) resources. The method may include, for each of the plurality of TRPs, measuring a pathloss of each common reference signal among the first and second set of reference signals. The method may include selecting a transmit beam and a TRP and sending a transmission to the selected TRP. The transmit beam may be associated with an antenna panel of the WTRU.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 4. is a diagram illustrating an example procedure for panel selection for a physical uplink control channel (PUCCH) transmission;

FIG. 6 is a diagram illustrating an example procedure of a conditional panel/transmission-reception point (TRP) pair selection for a PUCCH transmission in an MTRP deployment;

DETAILED DESCRIPTION

Figure 1A:
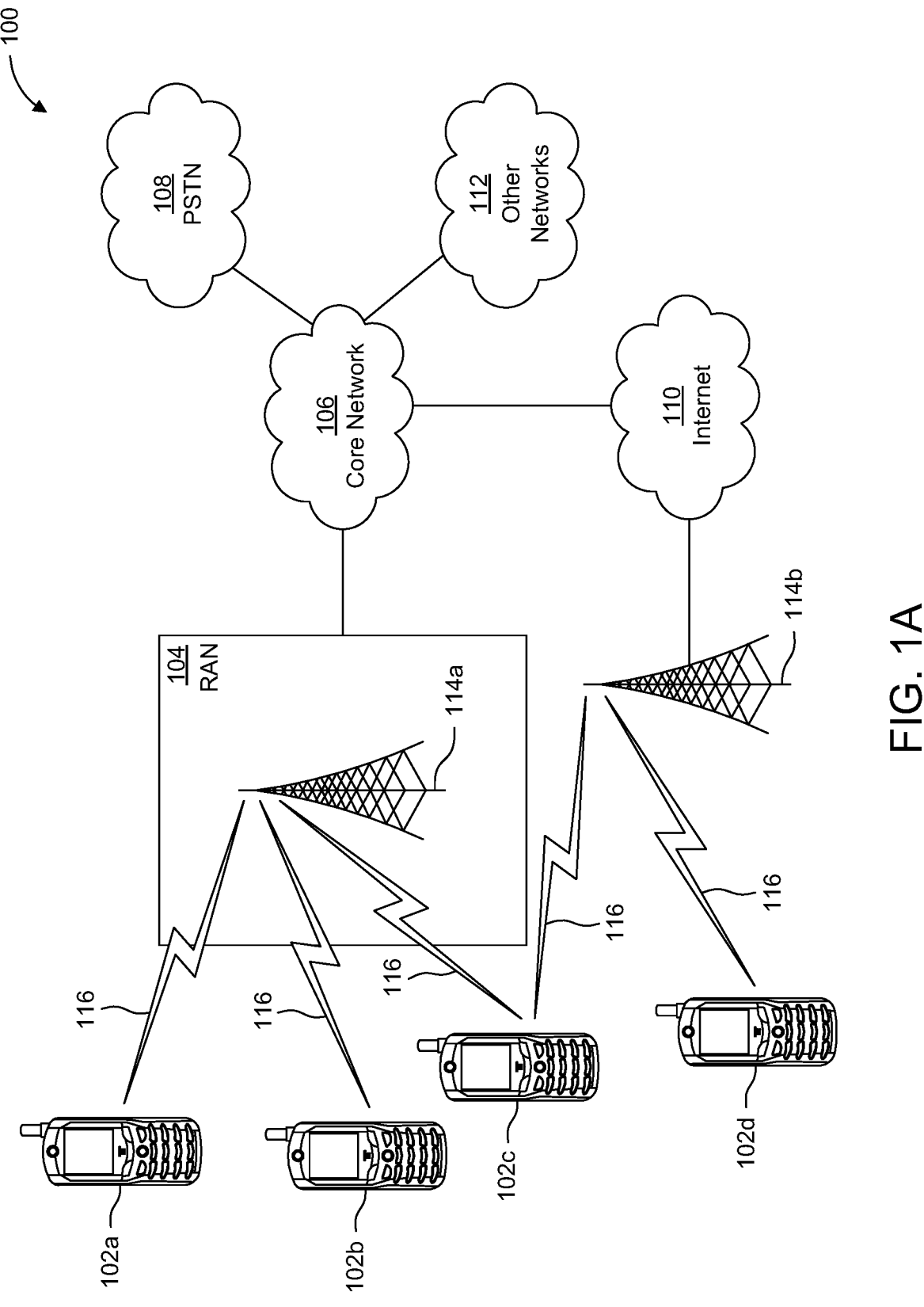
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
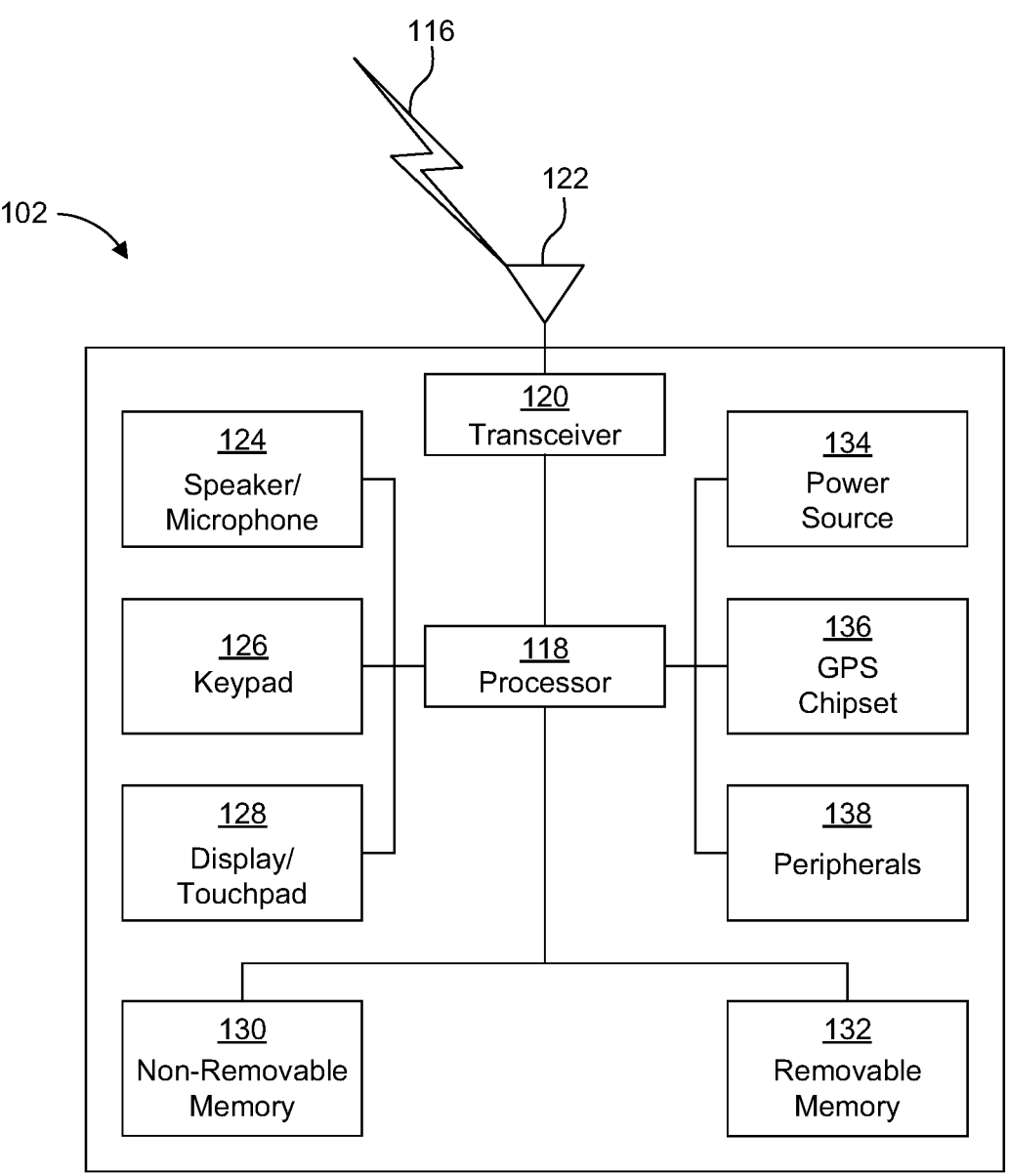
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
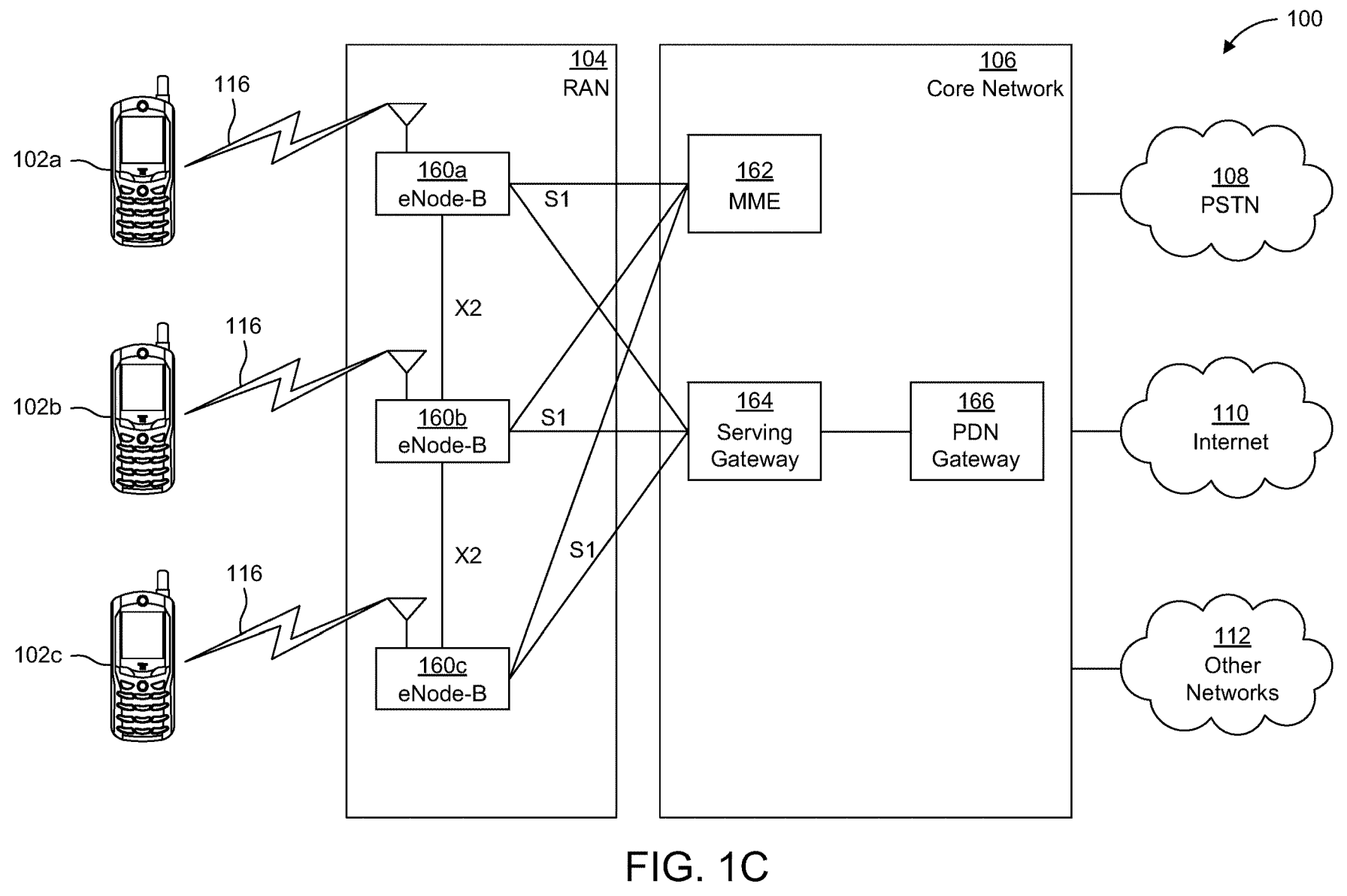

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency communications (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*b*, UPF 184*a*-*b*, SMF 183*a*-*b*, DN 185*a*-*b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In NR wireless communications, operation with multiple base stations or transmission-reception points (TRPs) is supported. Specifically, in NR, multi-TRP (MTRP) operation is supported with the initial focus on downlink transmission. As such, an NR WTRU can receive and process multiple NR-physical downlink control channels (NR-PDCCHs) and NR-physical downlink shared channels (NR-PDSCHs).

Figure 2:
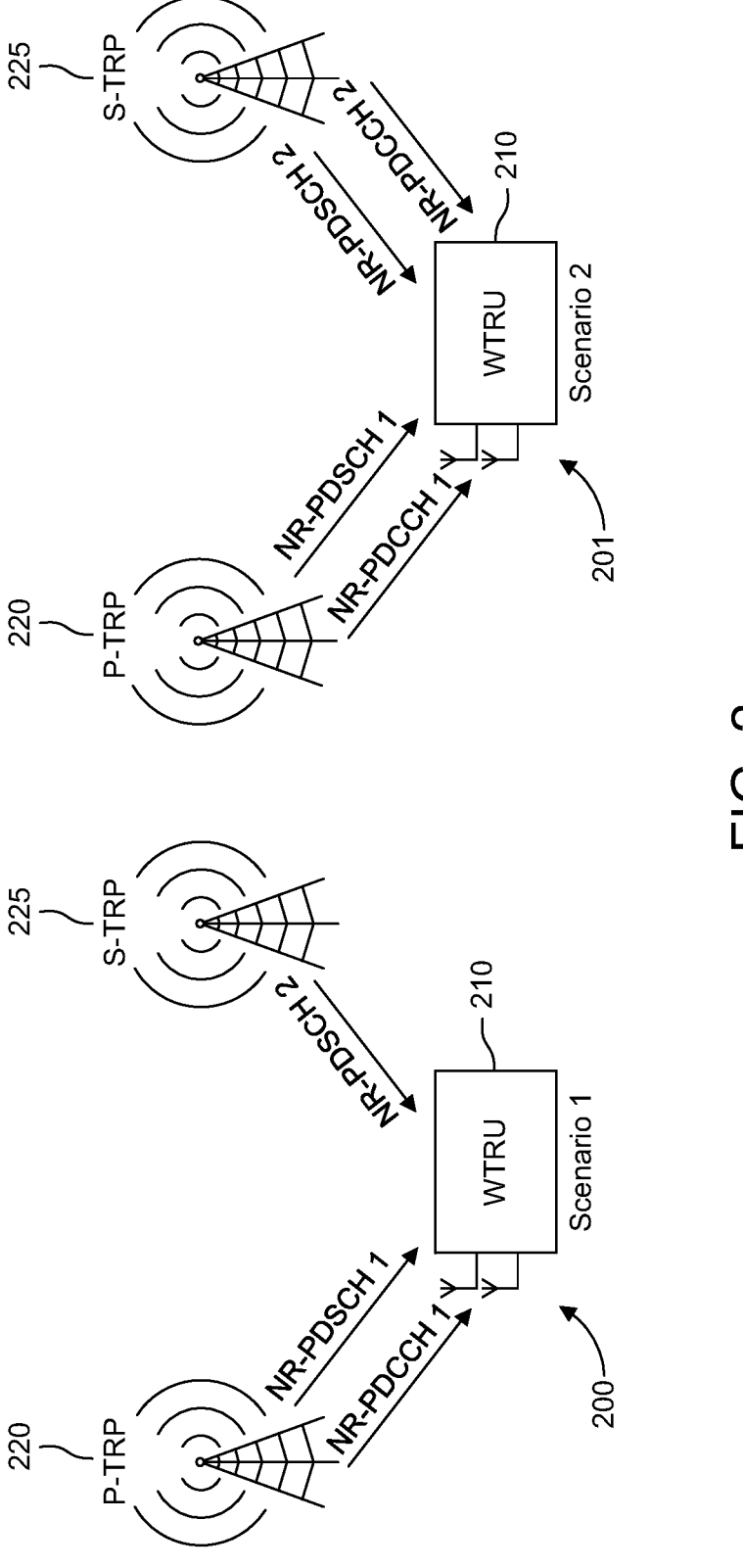
FIG. 2 is a system diagram illustrating an example single-downlink control information (DCI) multi-transmission-reception point (MTRP) configuration and an example multi-DCI MTRP configuration.

FIG. 2 is a system diagram illustrating an example single-downlink control information (DCI) MTRP configuration and an example multi-DCI MTRP configuration. As shown in an example in FIG. 2, two main options 200 and 201 of downlink MTRP operation may include a primary TRP (P-TRP) 220 and a secondary TRP (S-TRP) 225, respectively, which may be in communication with a WTRU 210 that has two or more antenna panels. In a first scenario, a single NR-PDCCH may schedule a single NR-PDSCH where separate layers are transmitted from separate TRPs. In a second scenario, multiple NR-PDCCH transmissions may each schedule a respective NR-PDSCH transmission where each NR-PDSCH transmission is transmitted from a separate TRP. In some examples, NR may support a maximum number of two NR-PDSCHs and two NR-PDCCHs.

Further, NR supports MTRP transmission for a downlink shared data channel for eMBB and URLLC scenarios. To enhance reliability and robustness of downlink data transmission for URLLC, at least four different transmission schemes for PDSCH may be used in NR. The supported mechanisms may be based on use of additional resources in spatial, frequency and time domains. Depending on the utilized scheme, the additional resources may be used to enable a lower code rate for transmission, or support repetition of the original transmission.

Enhancements may be made for both frequency range 1 (FR1) and frequency range 2 (FR2) in NR. One goal of further enhancements for NR may be the extension of similar reliability and robustness enhancements developed for the PDSCH to other physical channels, such as the PDCCH, a physical uplink shared channel (PUSCH) and a physical uplink control channel (PUCCH). Such enhancements may leverage MTRP capabilities, multi-panel capabilities, or both. Further, quasi co-location (QCL)/transmission configuration indicator (TCI)-related enhancements for enabling inter-cell MTRP with multi-DCI based multi-PDSCH may be enabled. Also, further beam management aspects may be developed. Additionally, another aspect of NR MIMO may be to apply an MTRP concept to support a high speed train scenario in a single frequency network (HST-SFN).

Provided herein are enhancements related to PUCCH and PUSCH where a multi-panel WTRU may enhance the reliability of its transmission by selecting the best panel. A WTRU may be built with several sets of antenna panels, where each set may have multiple antenna elements.

Figure 3:
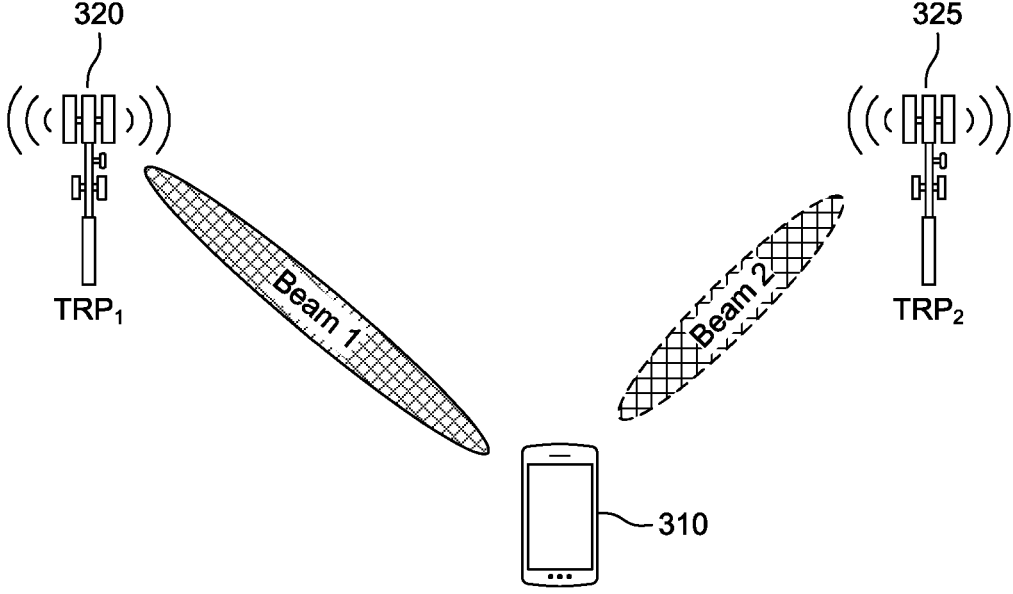
FIG. 3 is a system diagram illustrating an example of a selection of the best panel in a multi-panel WTRU.

FIG. 3 is a system diagram illustrating an example of a selection of the best panel in a multi-panel WTRU. As shown in an example in FIG. 3, each panel may be placed on a different side of a WTRU 310. The WTRU 310 may be in communication with a first TRP 320 and a second TRP 325. The WTRU 310 and the TRPs 320 and 325 may transmit and/or receive information using beamforming methods. Since the transmission channels between WTRU panels and TRPs may not be similar, a WTRU may determine and use the best panel for uplink transmission. In other words, while enhanced transmission through employing multiple panels in some cases may be beneficial, it is not always necessary to use all panels for transmission.

Provided herein are procedures for the selection of the best panel for a PUCCH. A WTRU may be configured in a dynamic or a static manner to select the best panel for the WTRU's uplink transmission. Furthermore, a WTRU may be configured to perform selection of the best panel entirely based on the WTRU's discretion, or based on a direction received from a nodeB, such as a gNB. Hereafter, a panel may be used interchangeably with a beam, spatial Tx parameter(s), spatial transmission parameter(s), spatial Rx parameter(s), spatial reception parameters, a Tx beam, a transmission beam, an Rx beam, a reception beam and a set of antennas, and still be consistent with the examples provided herein.

Examples provided herein include WTRU-based panel selection. In an MTRP system, a WTRU may be configured with a set of downlink reference signals per bandwidth part wherein one or more subsets of configured reference signals may be associated with each TRP. In some examples, the set of downlink reference signals may include a synchronization signal block (SSB), a channel state information-reference signal (CSI-RS), and the like. The configured reference signals may be used for pathloss measurements per bandwidth part per TRP.

In some examples with two TRPs, each codepoint in the configured set of reference signals may contain two indices where each index relates or associates a reference signal to or with a TRP. Additionally or alternatively, a configured set of reference signals may be divided in odd and even groups, or first and second halves of the set, to relate or associate a configured reference signal to or with either of the two TRPs. In further examples, a WTRU may be configured with two separate sets of reference signals where each set is related to a corresponding TRP.

Similarly, a WTRU may be configured with a set of PUCCH spatial relation information through which one or more spatial relationships between the PUCCH and a downlink reference signal may be considered per bandwidth part for each TRP. A WTRU may determine a transmission beam for a PUCCH transmission based on the configured or determined PUCCH spatial relation information, wherein each PUCCH spatial relation information may include an associated set of reference signals, which may include downlink beam reference signals and/or uplink beam reference signals. In examples, the associated downlink reference signals may include an SSB, a CSI-RS, and the like. Further, the uplink beam reference signal may include a sounding reference signal (SRS), in an example. A PUCCH spatial relation information may have an identity which may be referred to as a PUCCH spatial relation information identity. In an example, the spatial relation information identity may expressed as an information element. For example, the spatial relation information identity may be expressed as a pucch-SpatialRelationInfoId.

Hereafter, a PUCCH spatial relation information may be used interchangeably with a PUCCH spatial relation information identity, a beam-id for PUCCH, a PUCCH beam identity, a PUCCH beam-id, a PUCCH beam, spatial information, and PUCCH spatial information, and still be consistent with the examples provided herein.

In some examples, a WTRU may be configured with multiple PUCCH beam identities, and one or more PUCCH beam-identities (IDs) may be activated. In such cases, one or more of following examples may apply.

For example, a WTRU may determine one of the activated PUCCH beam-IDs, wherein the number of activated PUCCH beam-IDs may be the same as the number of TRPs associated with a PUCCH transmission or the number of activated PUCCH beam-IDs may be the same as the number of panels at the WTRU. The WTRU may determine a PUCCH beam-ID for PUCCH transmission based on the downlink measurement on the one or more downlink beam reference signals associated with the PUCCH beam-IDs activated, wherein the measurement may be at least one of reference signal received power (RSRP), L1-RSRP, signal-to-interference-and-noise ratio (SINR), L1-SINR, and the like.

A WTRU may determine one of the activated PUCCH beam-IDs based on a power back-off value of the associated PUCCH transmission beam. For example, a WTRU may determine to use a PUCCH beam-ID of a transmission power back-off value for when the transmission power back-off value due to a maximum permissible exposure (MPE) is less than the other PUCCH beam-ID.

A WTRU may determine one of the activated PUCCH beam-IDs based on whether the associated panel is on or off. In an example with two TRPs, each codepoint in the configured set of spatial relation information may contain two indices where each index points to either of the TRPs. Additionally or alternatively, a configured set of spatial relations may be divided in odd and even groups, and/or into first and second halves of the set to relate a spatial relation information to either of the TRPs. In some examples, a WTRU may be configured with two separate sets of spatial relation information.

In further examples, a WTRU may be configured with one or more PUCCH resources with different PUCCH spatial relation information and the WTRU may select one of the PUCCH resources based on a downlink measurement. For example, one or more PUCCH resources may be configured in a same slot and/or same set of the symbols and a WTRU may determine which PUCCH resource to use for a PUCCH transmission. Therefore, determining a PUCCH resource may result in, or involve, determining a PUCCH beam-ID.

Each PUCCH resource may be associated with a TRP and configured with a PUCCH spatial relation information. Further, a WTRU may measure associated beam reference signals for the PUCCH resources and determine a PUCCH based on the measurement. For example, the WTRU may measure a beam reference signal providing the highest measurement quality and the beam reference signal may be associated with a PUCCH resource. The WTRU may then determine a PUCCH based on the measurement.

A WTRU may be configured with more than one set of reference signals and spatial relations per bandwidth part per TRP by higher layer signaling. A WTRU may determine the activated subset of reference signal and spatial relations dynamically from a DCI or MAC control elements, or from any logical equivalent of such signaling.

Since TRPs may be located at different relative locations with respect to a WTRU, a WTRU equipped with more than one panel may determine the best panel for PUCCH transmission based on a per TRP measurement, for example, a pathloss. In an example, a WTRU may be configured with a set of reference signals, such as for PUCCH pathloss measurement, and spatial relation information for each TRP. A WTRU may perform measurements based on a configured downlink reference signal to determine the best panel for an uplink PUCCH transmission. In some examples, the downlink reference signal may be one or more of an SSB, CSI-RS, and the like. In further examples, the selection of the best panel may be defined as the panel that yields a certain transmission characteristic. For example, the selection of the best panel may be defined as the panel that yields the highest SINR, RSRP, or other signal quality metric. Additionally or alternatively, the best panel may be defined as the panel that has an associated measurement exceeding a configured threshold or meeting a required level to achieve an expected performance.

Based on the configured spatial relation information for the measured RS, a WTRU may select the beam used for measuring the RS for PUCCH transmission. For example, some panel may use a fixed beam for transmission and/or reception, while other panels may use steerable beams for transmission and/or reception. Hence, multiple beams, each having a "beam" reference signal may need to be evaluated to determine the best panel and/or the best TRP to use for a PUCCH transmission. A WTRU may perform the measurement only on configured reference signals that correspond to reference signals of configured spatial relation information. For example, the configured set of reference signals may be a first set of reference signals, while spatial relation information may associate each of one or more beams with one or more of a second set of reference signals, which may also be referred to as a set of "beam" reference signals. The WTRU may evaluate the first and second set of reference signals to determine whether a common reference signal exists within the two sets. For each common reference signal, the WTRU may perform measurements to determine, e.g., a pathloss along a spatial path where a PUCCH transmission may be performed. Such evaluation and measurement processes may be performed separately for each TRP in an MTRP deployment. Based on the evaluation and measurement processes, the WTRU may determine the best beam and/or the best TRP with which to perform the PUCCH transmission.

FIG. 4 is a diagram illustrating an example procedure for panel selection for a PUCCH transmission. It should be noted that some or any of the steps illustrated in FIG. 4 may be performed sequentially, simultaneously, or in an order not shown, and a method performed according to the example as shown may comprise any one or more of the illustrated steps in any particular combination. As in scenarios described substantially in paragraphs above, a WTRU may be in communication with multiple TRPs. In examples as shown in FIG. 4, at 410, a WTRU may receive or be configured to receive PUCCH pathloss reference signals for one or more TRPs. For example, the WTRU may be configured to use a reference signal or a set of reference signals to measure or determine pathloss. The WTRU may also receive, or be configured to receive PUCCH spatial relation information for one or more TRPs. If the WTRU is not configured with at least one set of PUCCH spatial information per TRP, the WTRU may not perform panel selection. At 420, the WTRU may determine the PUCCH pathloss reference signals, if any, for which PUCCH spatial information has been configured or is associated. At 430, the WTRU may determine, for each TRP, whether a common reference signal exists between the configured reference signals and the reference signals referred to or indicated by the PUCCH spatial information. If a WTRU is configured with at least one set of PUCCH spatial information per TRP, but the configured set of reference signals for pathloss measurement does not share any reference signal with the reference signals indicated in or associated with the PUCCH spatial information, the WTRU may not perform panel selection, shown at 435. At 440, the WTRU may perform separate pathloss measurements for each TRP, using at least the configured set or sets of reference signals. Based on at least the measurement or measurements, at 450, the WTRU may determine the best panel for performing a transmission on a PUCCH to one or more of the TRPs. The determination as to the best panel may be made per TRP, or for more than one TRP. At 460, the WTRU may transmit a PUCCH transmission using spatial information or parameters associated with the determination performed in 450 (i.e., the determination of the best panel).

In some examples, a WTRU may also receive a default configuration for a PUCCH transmission that may be used if panel selection was not possible. For example, the default configuration may be used when a WTRU cannot determine a common reference signal (RS) between the reference signals referred to by the configured PUCCH spatial relation information and the respective configured PUCCH pathloss RS.

A default configuration for PUCCH transmission may include one or more of a specific panel, a specific TRP, a PUCCH pathloss RS, a PUCCH spatial relation, or beam, information including at least one RS, one or more PUCCH resources and the like. In an example, the default configuration may be received by the WTRU as a full description of the configuration. In further examples, the default configuration may be received by the WTRU as an indication, an index or a pointer to a set of configurations already provided to the WTRU.

In some examples, a WTRU may be configured with a specific TRP as the default TRP where its configuration may include a PUCCH pathloss RS, a PUCCH spatial relation, beam, information including at least one RS and one or more PUCCH resources. In some examples, the default TRP may be an anchor TRP, a primary TRP or both.

The WTRU may determine the preferred panel by performing separate measurements on each panel considering different combinations of PUCCH pathloss RS(s) and PUCCH spatial relation(s) configured for the default TRP. Additionally or alternatively, a WTRU may determine the preferred panel by performing separate measurements on each panel considering only PUCCH pathloss RS configured for the default TRP.

The selection of the best panel may be defined as the panel that yields the highest SINR, RSRP, and the like. Additionally or alternatively, the best panel may be the panel that has an associated measurement exceeding a configured threshold or meets a required level to achieve an expected performance.

In some examples, a WTRU may use a default panel for PUCCH transmission. For example, a specific panel as the default panel where the selected panel may be the panel used for the last PUCCH transmission or another uplink transmission. The uplink transmission may be an SRS transmission or a PUSCH transmission. In further examples, the selected panel may be a panel selected randomly by the WTRU. In another example, the selected panel may be the panel associated with a specific feature, such as, for example, size, dimension, gain, polarization, and the like. Further, the selected panel may be the panel associated with an operational feature, such as, for example, power consumption and the like.

Additionally or alternatively, the default mode may be defined as a transmission using both panels on a configured PUCCH resource. In some examples, a WTRU may use more than one panel for an entire PUCCH transmission. Additionally or alternatively, a WTRU may perform panel switching by alternating its PUCCH transmission over the panels.

Figure 5:
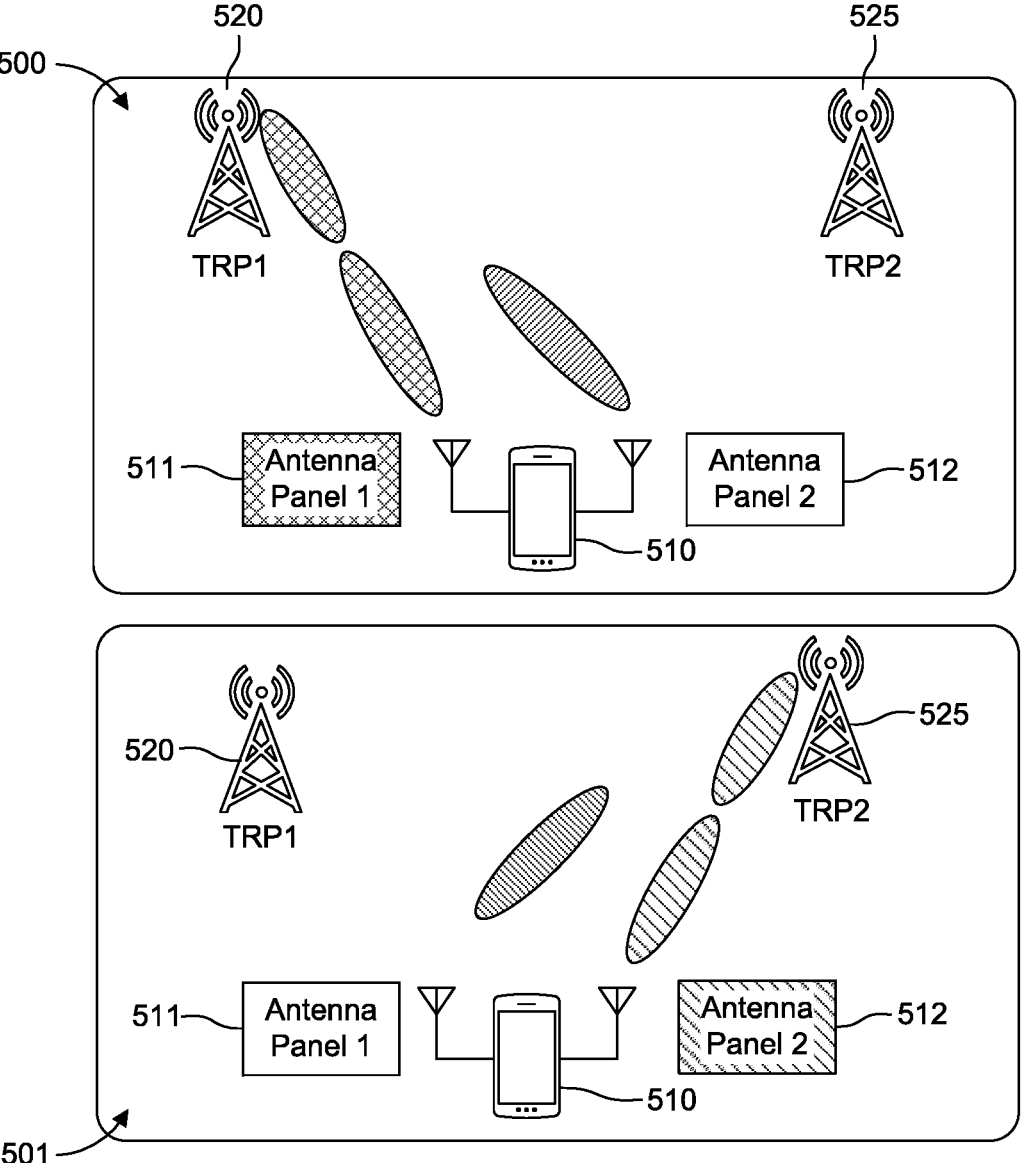
FIG. 5 is a system diagram illustrating an example of panel selection in an MTRP deployment.

FIG. 5 is a system diagram illustrating an two corresponding examples of panel selection 500 and 501 in an MTRP deployment. As shown in FIG. 5, antenna panels 511 and 512 may be placed on different sides of a WTRU 510. The WTRU 510 may be in communication with a first TRP 520 and a second TRP 525. The WTRU 510 may transmit and/or receive transmissions to and/or from TRPs 520 and 525 using one or more of the antenna panels 511 and 512. The WTRU 510 may perform panel selection according to one or more methods as described substantially in paragraphs above, or according to a combination of the same. The panel selection may be for a PUCCH transmission. Further, a default panel may be used for PUCCH transmission in an MTRP deployment, in an example case. A WTRU 510 may receive a PUCCH configuration for each of the TRPs 520 and 525, where the configuration may include information for measuring a first set of reference signals (e.g., PUCCH pathloss RSs), PUCCH spatial relation, or beam, information including at least one RS, and one or more PUCCH resources. The WTRU 510 may determine the preferred TRP by performing separate measurements on each TRP 520 and 525 considering different combinations of one or more PUCCH pathloss RSs and one or more PUCCH spatial relations. For example, as shown in scenario 500, the WTRU 510 may determine that TRP1 (520) is the preferred TRP, while in the scenario shown at 501, the WTRU 510 may determine that TRP2 (525) is the preferred TRP. Although FIG. 5 portrays an MTRP deployment in which two TRPs are used, the above systems, procedures, may be applicable to deployments in which more than two TRPs are used.

FIG. 6 is a diagram illustrating an example procedure of a conditional panel/MTRP pair selection for a PUCCH transmission in an MTRP deployment illustrated in the system diagram of FIG. 5. As shown in an example in FIG. 6, MTRP pair selection may be based on commonality between a PUCCH pathloss RS (e.g., a first set of RSs) and a TRP PUCCH spatial RS (e.g., a second set of RSs). For WTRUs with fixed beam panels, spatial information may be associated with one or more panels. For WTRUs having steerable beam panels, spatial information pay permit selection of both a panel and a beam for performing the PUCCH transmission to a particular TRP. It should be noted that some or any of the steps illustrated in FIG. 6 may be performed sequentially, simultaneously, or in an order not shown, and a method performed according to the example as shown may comprise any one or more of the illustrated steps in any particular combination.

For example, at 610, a WTRU may receive configuration information, such as a PUCCH configuration, for each of the TRPs, where the configuration may include a PUCCH pathloss RS, a set of PUCCH pathloss RSs (e.g., a first set of RSs), PUCCH spatial relation, beam, information including or indicating at least one RS, and one or more PUCCH resources. In some examples, the PUCCH spatial relation information may refer to an RS or set of RSs (e.g., a second set of RSs), and may associate the RS or set of RSs with beams, a set of beams, a panel, or a set of panels. In some examples, the WTRU may have a default configuration for a PUCCH transmission. The default configuration may be received together with the PUCCH configuration, preconfigured at the WTRU, or configured separately. The default configuration, and/or the PUCCH configuration may be received via layer 1 signaling, radio resource control (RRC) signaling, a MAC layer control element, or any other logical equivalent.

At 620 and 630, the WTRU may determine for each TRP whether the respective configured PUCCH spatial relation information (e.g., the second set of RSs) indicates or references an RS common in with the respective configured PUCCH pathloss RS. In an example case where the WTRU does not determine a common RS between configured PUCCH spatial relation information and the respective configured PUCCH pathloss RS, the WTRU may not perform panel selection, as shown at 635. In such case, the WTRU may transmit its PUCCH using the default PUCCH transmission mode.

If the WTRU determines that the configured PUCCH spatial relation information of each TRP includes an RS common with the respective configured PUCCH pathloss RS, then at 640, the WTRU may perform separate measurements on the PUCCH pathloss RS of each TRP. Further, at 650, the WTRU may determine a pair of UL spatial information, or a panel, and a TRP based on the measurements. The selection of the preferred pair may be based on a metric, for example, RSRP, and checking whether the metric exceeds a preconfigured threshold or meets a required level for achieving a suitable performance level.

As shown at 660, the WTRU may transmit a PUCCH transmission on a PUCCH resource from the configured PUCCH resources of the TRP of the determined panel/TRP pair. Further, the WTRU may use the UL spatial information, or panel, of the determined panel/TRP pair.

Examples provided herein contain direct panel selection for use with a nodeB, such as a gNB. In an example, a WTRU may be configured with multiple SRS resources, where each panel is configured with at least one SRS resource. In a multi-TRP deployment, a WTRU equipped with multiple panels may transmit a set of SRSs from each panel. Upon reception of the transmitted SRS signals, the nodeB may indicate the best panel for PUCCH transmission.

In some examples, a WTRU may determine the best panel by the received SRS resource indicator (SRI), where the SRI implies the panel preferred by the nodeB. Additionally or alternatively, a WTRU may determine the preferred panel through L1 signaling, for example, a MAC control element (CE), a DCI field, or any logical equivalent.

In some examples, a WTRU may be configured with multiple PUCCH resources where each PUCCH resource may be configured for a different panel. A WTRU may determine the preferred panel through the indicated PUCCH resource indicator field in the received DCI.

Examples provided herein include procedures for selecting the best panel for transmission on a PUSCH. If a PUSCH is not configured with a spatial relation indicating which panel to use, or if a PUSCH is configured with two different spatial relations corresponding to two TRPs and the WTRU does not know which one to use, a WTRU may determine its best panel based on a default panel. In some examples, the default panel may be configured as a default panel index.

Additionally or alternatively, the default panel may be determined based on a timer which configures a period of time within which a default best panel choice is valid. In an example, the timer may be preconfigured. In some examples, the time may be configured or indicated by a base station. In a further example, the timer may be a default-PanelTimer.

For example, a WTRU may use the same panel for the PUSCH transmission that the WTRU chose to receive the PDCCH transmission with the corresponding scheduling grant if the PUSCH transmission is sent within a time gap after the PDCCH transmission. In such case, it may be necessary that the time gap is less than the period of time provided by the timer, for example, the defaultPanelTimer. This timer may be configured by the nodeB depending on WTRU capability, channel variability, and the like.

Further, if a WTRU sends a PUSCH transmission to one TRP and a single PDCCH transmission is used, the WTRU may determine the best panel for the PUSCH transmission is the same panel used to receive the PDCCH transmission if the PUSCH transmission is sent within the time gap. Moreover, if the WTRU sends a PUSCH transmission to one TRP and two PDCCH transmissions are used, the UE may determine the best panel for the PUSCH transmission based on the PDCCH transmission with the best received signal quality.

Examples provided herein include dynamic panel selection by a WTRU. Specifically, the WTRU may indicate its best panel to the TRP with a dynamic indication prior to sending a PUSCH. The dynamic indication may be sent as part of a CSI report triggered by the WTRU where the contents of the report indicate implicitly or explicitly the best panel index. The WTRU may trigger sending a report with the best panel index prior to a scheduling request (SR). The best panel report may also be sent together with the SR as part of the CSI report. Additionally or alternatively, the WTRU may trigger a report when an event at the devices causes the best panel to change. In examples, the event may include one or more of turning off a panel to save power, a blocked panel, and the like.

To avoid sending the best panel index for every SR or too frequently, a validity timer may be included with the panel index or preconfigured such that a best panel index may be considered valid within the validity period. Additionally or alternatively, a counter may be indicated by the WTRU or configured at the nodeB to determine the number of SR for which the best panel index is valid. The best panel index may expire after the validity period or counter and the WTRU may resort to a default panel selection which may have been preconfigured.

The WTRU may determine the best panel due to measurements based on one or more DL reference signals (RSs) by assuming reciprocity between reception and transmission beams at the WTRU. Accordingly, beam correspondence may hold at a WTRU. The best panel may be reported by the WTRU as in the following examples.

In some examples, the best panel can be reported by the WTRU as a panel index linked to each WTRU's panel. The WTRU may explicitly signal the best panel index to the TRP.

In some examples, the best panel may be reported by the WTRU as an SRI, if an SRI is linked with a panel. The WTRU may implicitly signal the best panel through the configured association with the SRI. SRS resources may be configured per panel such that one SRS resource may correspond to one panel. The WTRU may explicitly signal the index of the preferred SRS resource that corresponds to the WTRU's preferred panel. For example, for one downlink RS, a WTRU may use SRI 1 to receive transmissions on panel 1 and SRI 2 to receive transmissions on panel 2. A WTRU may measure the received signal quality on each SRI and the WTRU may trigger a report to the nodeB to signal the best panel.

In further examples, the best panel can be reported by the WTRU as a DL RS index, if a DL RS is linked with a panel. The WTRU may implicitly signal the best panel through the configured association with the DL RS index.

In additional examples, the best panel may be reported by the WTRU as the TRP index, if the TRP index is configured with a panel. The WTRU may implicitly signal the best panel through the configured association with the TRP index.

In further examples, the best panel may be reported by the WTRU as a CORESETPoolIndex, if each CORESET-PoolIndex is configured with a panel. The WTRU may implicitly signal the best panel through the configured association with the CORESETPoolIndex.

In further examples, the best panel may be reported by the WTRU as a CORESET-ID, and each CORESET may be associated with a panel. Further, the WTRU may report to the nodeB the best panel index by indicating a preferred CORESET-ID within the configured CORESETs.

The WTRU may include the best panel as part of a CSI report in an uplink control information (UCI) message. CSI reporting on UCI may be modified to include SRI. Additionally or alternatively, a panel index may be included with a DL RS index or TRP index to indicate the WTRU's best panel associated to the DL RS, TRP index, or CORESET-PoolIndex. Additionally or alternatively, the WTRU may trigger a random access channel (RACH) procedure to signal the best panel to the nodeB. The best panel may be included as part of the msg3 or msgA payload.

A nodeB may receive the indicated best panel from the WTRU. Further, the nodeB may adjust its spatial receive filter accordingly to maximize the received signal quality of PUSCH.

Examples provided herein include panel specific configured grants. Specifically, a configured grant may be radio resource control (RRC) configured with a panel index as part of the configuration, and multiple grants may be configured with each linked to a separate panel. A WTRU receiving an activation command for a grant may implicitly determine the panel to use for the WTRU's PUSCH transmission. SRS resources may be configured for the WTRU with a link between the panel index and the SRS resource. The WTRU may transmit multiple SRSs and the TRP may receive the multiple SRSs. The TRP may measure the received signal quality on each SRS and the TRP may determine the best SRI. The TRP may trigger to activate the configured grant with the panel index associated to the SRI with the best measured quality report. The WTRU may receive the activation command and may determine the best panel to use based on the activated grant.

Figure 7:
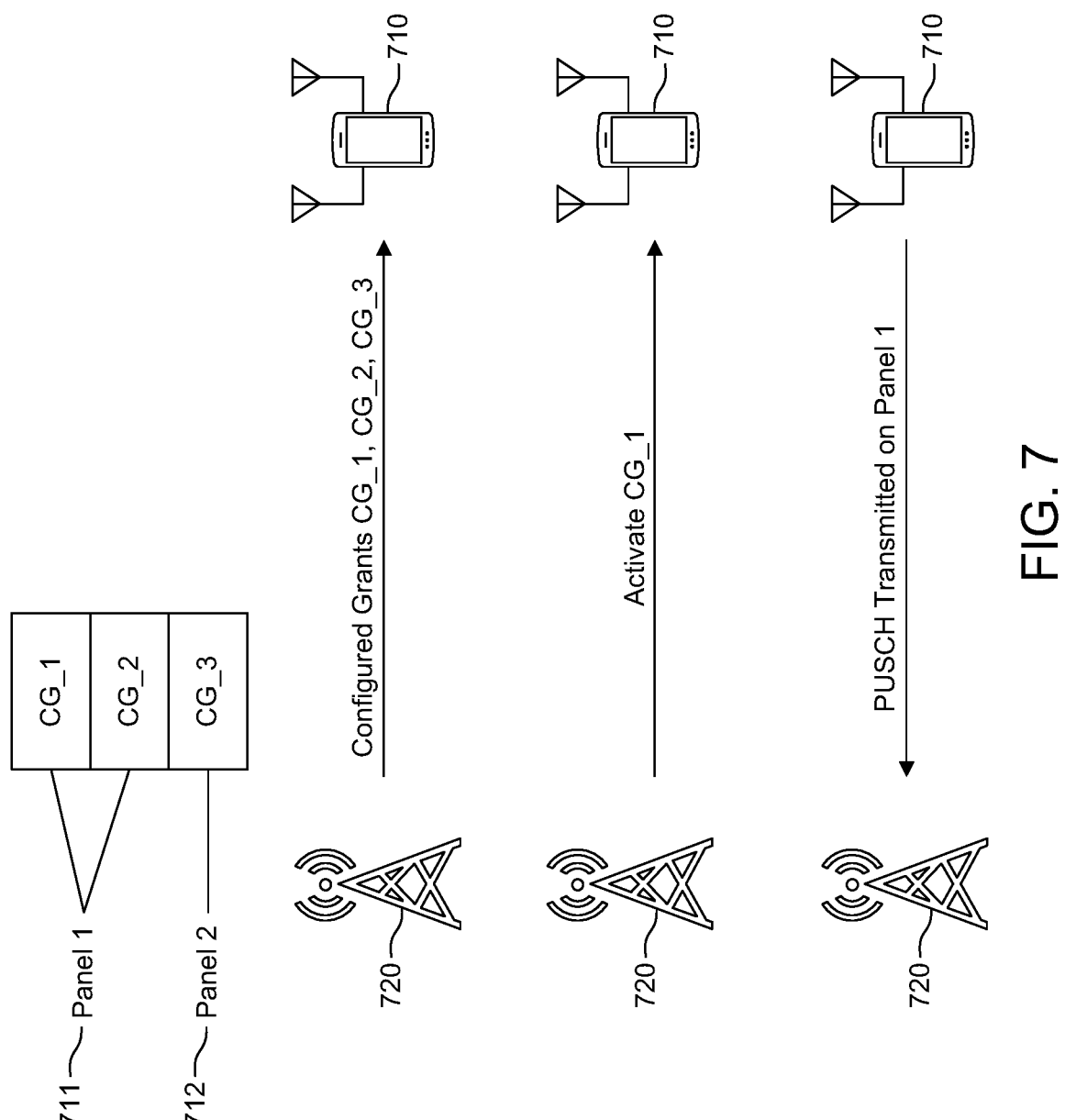
FIG. 7 is a diagram illustrating an example of panel selection for a physical uplink shared channel (PUSCH)

FIG. 7 is a diagram illustrating an example scheme for panel selection for PUSCH transmissions. As shown in an example in FIG. 7, a WTRU 710 may be equipped with two panels, panel 1 and panel 2, denoted in FIG. 7 by elements 711 and 712. A TRP 720 may set up 3 different configured grant configurations CG_1, CG_2, and CG_3. Panel 1 may be linked to CG_1 and CG_2, and panel 2 may be linked to CG_3. The configurations may be signaled as part of WTRU 710's RRC configuration. At some point, the TRP 720 may activate CG_1 via signaling to the WTRU 710. The WTRU 710 may receive the activation command for CG_1 and may be scheduled to transmit over a PUSCH. The WTRU 710 may determine to use panel 1 for the PUSCH transmission based on the linkage with the CG_1.

If no SRI is indicated in the activation message, the WTRU 710 may choose any one of the SRS resources corresponding to the panel index linked to the activated grant. Alternatively, or additionally, the configured grant may be configured with a link to an SRI where the SRI may be linked to a panel index. Upon receiving the activation grant, the WTRU 710 may determine the SRI to use for the PUSCH transmission.

For a PUSCH, different SRS resources may be configured for each TRP, and ports associated with a specific SRS resource may be selected for transmission. For the case of dynamic grant, the selection may be based on the indicated SRI or a WTRU measurement. In the case of configured grant type I, best port (panel) selection may be based only on a measurement(s). In the case of configured grant type II, best port (panel) selection may be based on the received activation command that provides an opportunity for spatial relation update. Configuring multiple grants, where each grant corresponds to one panel d may be undertaken in an example.

Examples provided herein include indicating a WTRU panel selection to a node B, such as a gNB. For example, a WTRU may use an initialization seed.

Figure 8:
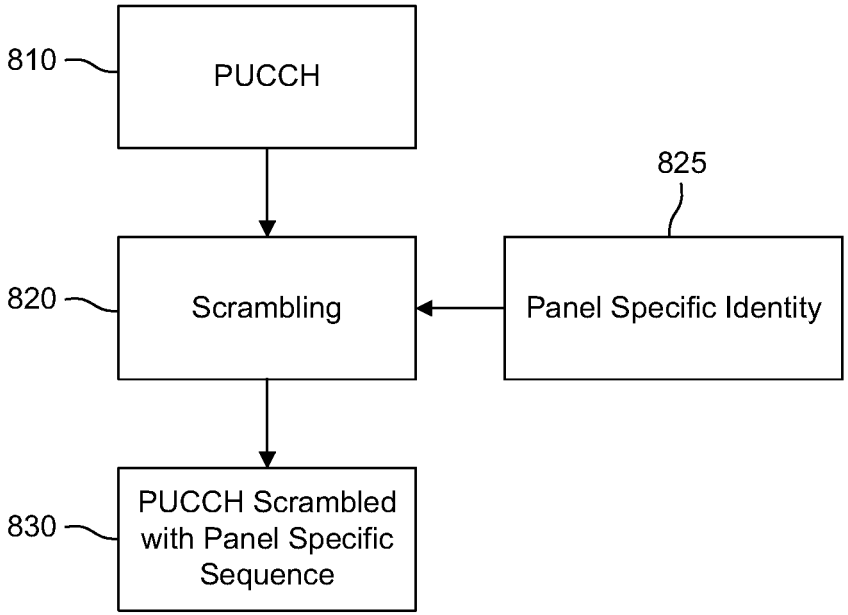
FIG. 8 is a diagram illustrating an example procedure for indication of panel selection.

FIG. 8 is a diagram illustrating an example procedure for indication of panel selection. In FIG. 8, as shown at 810, a WTRU may determine or be configured to send a transmission in the uplink direction using a PUCCH. At 820, to indicate a preferred panel selection of a WTRU for PUSCH transmission to a nodeB, the WTRU may use an initialization seed for scrambling of the PUCCH. As shown at 825, the initialization seed may be a panel specific identity. Subsequently, at 830, the WTRU may transmit the PUCCH scrambled using the initialization seed, e.g., the panel specific identity. A nodeB may receive a PUCCH transmission or transmissions and attempt descrambling to determine which panel or panels were used to perform the transmission. Since the number of potential WTRU panels may be relatively small, a nodeB may monitor all possible scrambling options, based, for example, on a configured number of panels, to identify the panel selection at the WTRU. For example, for a WTRU with two panels, indexed 0 and 1, a nodeB may need to try only two descrambling options to determine the selected panel.

In an example, a panel identification process may be facilitated if a nodeB first attempts to monitor the scrambling identity corresponding to the most recently used panel. Upon the determination of the panel, a WTRU may assume that the same panel will be used for subsequent transmission of PUCCH unless a timer with a configurable duration expires, or the nodeB detects a new selection by WTRU.

For example, for PUCCH formats 2, 3 and 4, the scrambling sequence generator may be initialized with $$c_{int} = n_{RNTI} \cdot 2^{15} + n_{ID} \qquad \text{Equation 1}$$

where, $n_{ID} \in \{0, 1, \ldots, 1023\}$ equals the higher-layer parameter dataScramblingIdentityPUSCH if configured, or $n_{ID} = N_{ID}^{cell}$ otherwise. And $n_{RNTI}$ is given by an identifier, such as a cell-specific radio network temporary identifier (C-RNTI). In an example, a panel specific $c_{int}$ could be generated by $$c_{int} = n_{RNTI} \cdot 2^{15} + n_{ID} \times 1023 + n_{ID}^{panel} \qquad \text{Equation 2}$$

where $n_{ID}^{panel} = \{0, 1, \ldots, N_{ID}^{panel}\}$. Here $N_{ID}^{panel}$=number of panels at the WTRU−1.

Another choice for $c_{int}$ could be $$c_{int} = n_{RNTI} \cdot 2^{15} + + n_{ID}^{panel} \times N_{ID}^{panel} + N_{ID} \qquad \text{Equation 3}$$

In some examples, a WTRU may report to a nodeB the selected/determined PUCCH beam-IDs within the activated PUCCH beam-IDs. Further, the nodeB may indicate which PUCCH beam-id to use for PUCCH transmission, wherein the indication may be carried in the DCI associated with the PUCCH transmission or the DCI associated with PDSCH corresponding to the PUCCH transmission.

A WTRU may transmit PUCCH with the indicated PUCCH beam-ID. If the WTRU did not receive a PUCCH beam-id, but the WTRU has to send a PUCCH, the previous PUCCH beam-id determined may be used.

When a sequence based PUCCH format is used, one or more sets of cyclic shift values of a sequence may be reserved or configured for PUCCH beam-ids and each set of cyclic shift values of a sequence may be associated with a PUCCH beam-id. A WTRU may determine a set of cyclic shift values of a sequence for PUCCH transmission based on the determined beam-ID. Panel identity may include at least one of PUCCH beam-ID, SRS resource set-ID, beam grouping identity, panel index, and physical antenna panel identity reported as WTRU capability.

Examples provided herein include uplink interference randomization in a multi-TRP system. To improve interference randomization for uplink transmission, a WTRU may randomize the interference based on the selected panel for transmission. Examples provided herein also include interference randomization for a PUCCH transmission. PUCCH scrambling may be mainly used to randomize out of cell interference.

Figure 9:
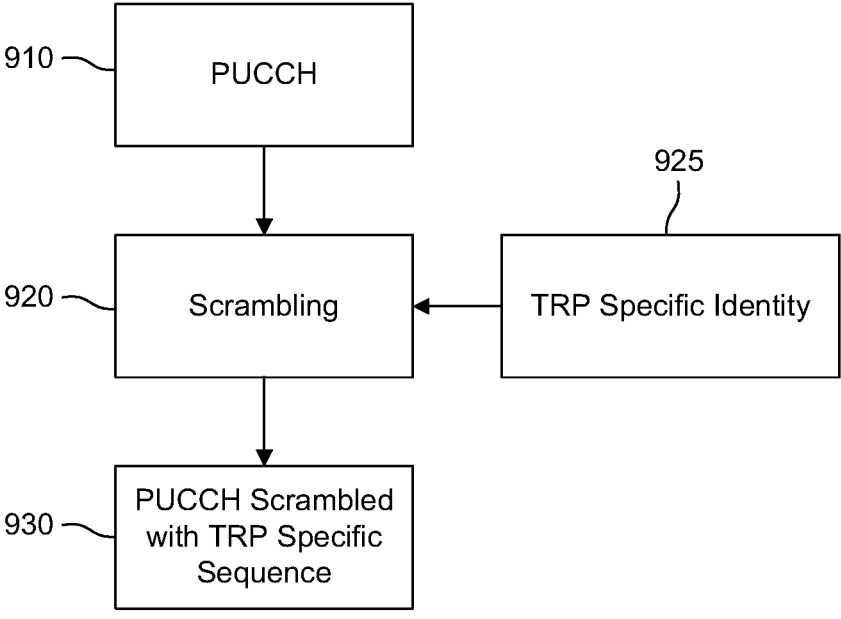
FIG. 9 is a diagram illustrating an example procedure for PUCCH interference randomization.

FIG. 9 is a diagram illustrating an example procedure for PUCCH interference randomization. In FIG. 9, as shown at 910, a WTRU may determine or be configured to send a transmission in the uplink direction using a PUCCH. At 920, to randomize out-of-cell interference, the WTRU may use a scrambling sequence for transmitting the PUCCH transmission. As shown at 925, the scrambling sequence generator may be initialized using a TRP-specific identity. Subsequently, at 930, the WTRU may transmit the PUCCH scrambled using the sequence, e.g., based on the TRP specific identity. A nodeB may receive a PUCCH transmission or transmissions and attempt descrambling. By basing initialization of the PUCCH scrambling sequence generator on a TRP identity, as shown in examples in FIG. 9, the interference may be further randomized and facilitate reuse of time/frequency resources. Herein, examples describe the procedure only for TRP identity, however the same procedure may be applied using a WTRU panel index or indices as well.

For example, $$c_{int} = n_{RNTI}2^{15} + n_{ID} \times 1023 + n_{ID}^{TRP} \qquad \text{Equation 4}$$

where $n_{ID} \in \{0, 1, \ldots, 1023\}$ is the higher-layer parameter dataScramblingIdentityPUSCH if configured, or $n_{ID} = N_{ID}^{cell}$ otherwise. The parameters $n_{ID}^{TRP}$ and $N_{ID}^{TRP}$ are defined as, $n_{ID}^{TRP} = \{0, 1, \ldots, N^{TRP}\}$ and $N_{ID}^{TRP} =$ number of TRPs in the cell−1, respectively. Additionally or alternatively, a WTRU may use $$c_{int} = n_{RNTI}2^{15} + n_{ID}^{TRP} \times N_{ID}^{TRP} + n_{ID} \qquad \text{Equation 5}$$

Figure 10:
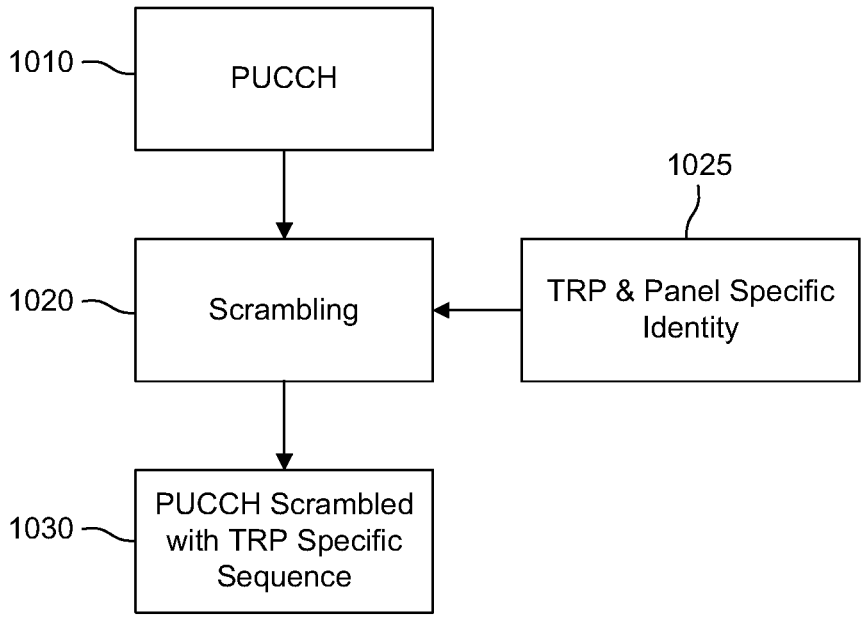
FIG. 10 is a diagram illustrating an example combined procedure of panel selection and interference randomization.

FIG. 10 is a diagram illustrating an example combined procedure of panel selection and interference randomization. As shown in an example in FIG. 10, a WTRU may use a combined approach of scrambling based on panel identity and TRP identity to simultaneously enable panel selection indication and interference randomization. In FIG. 10, as shown at 1010, a WTRU may determine or be configured to send a transmission in the uplink direction using a PUCCH. At 1020, to indicate a preferred panel selection of a WTRU for PUSCH transmission to a nodeB, and to randomize out-of-cell interference, the WTRU may use a scrambling sequence for transmitting the PUCCH transmission. As shown at 1025, the scrambling sequence generator may be initialized using both a panel identity and a TRP identity. Subsequently, at 1030, the WTRU may transmit the PUCCH scrambled using the sequence, e.g., based on the panel identity and TRP specific identity. A nodeB may receive a PUCCH transmission or transmissions and attempt descrambling.

In some examples, the PUCCH scrambling sequence generator may be initialized by $$c_{int} = n_{RNTI}2^{15} + n_{ID} \times 1023 + n_{ID}^{TRP} \times N_{ID}^{TRP} + n_{ID}^{panel} \qquad \text{Equation 6}$$

where $n_{ID} \in \{0, 1, \ldots, 1023\}$ is a higher-layer parameter dataScramblingIdentityPUSCH if configured, or $n_{ID} = N_{ID}^{cell}$ otherwise. $n_{ID}^{TRP} = \{0, 1, \ldots, N_{ID}^{TRP}\}$, and $N_{ID}^{TRP} =$ number of TRPs in the cell−1. $n_{ID}^{panel} = \{0, 1, \ldots, N_{ID}^{panel}\}$. Here $N_{ID}^{panel} =$ number of panels at the WTRU−1.

Alternatively, $c_{int}$ may be computed using any of the following calculations $$c_{int} = n_{RNTI}2^{15} + n_{ID} \times 1023 + n_{ID}^{panel} \times N_{ID}^{panel} + n_{ID}^{TRP} \qquad \text{Equation 7}$$

$$c_{int} = n_{RNTI}2^{15} + n_{ID}^{TRP} \times N_{ID}^{TRP} + n_{ID}^{panel} \times N_{ID}^{panel} + n_{ID} \qquad \text{Equation 8}$$

Examples provided herein include interference randomization for PUSCH. In some examples, a WTRU may use TRP-based scrambling.

Figure 11:
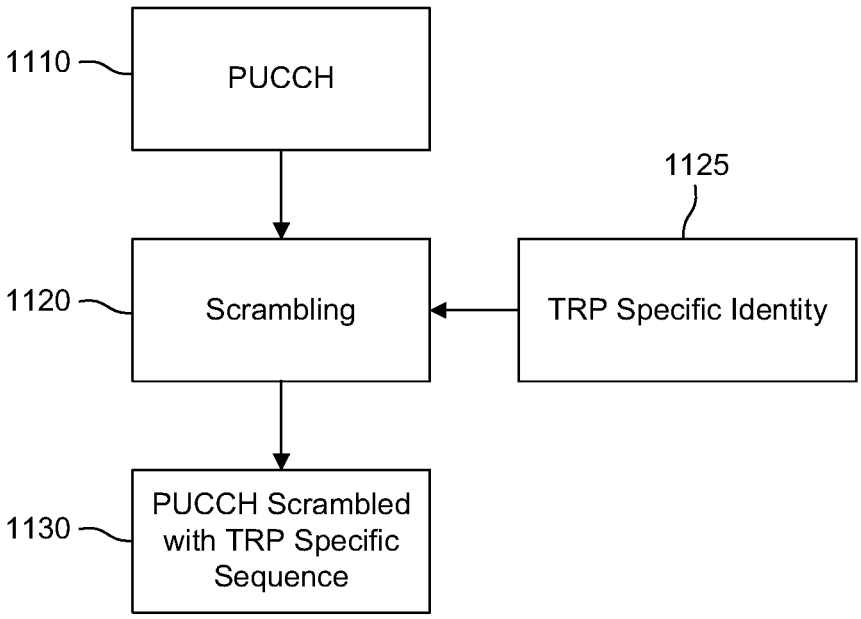
FIG. 11 is a diagram illustrating an example procedure for PUSCH interference randomization.

FIG. 11 is a diagram illustrating an example procedure for PUSCH interference randomization. As shown in an example in FIG. 11, and similar to examples described with respect to a PUCCH, a WTRU may use a TRP-based scrambling to further randomize interference in a multi-TRP system. In FIG. 11, as shown at 1110, a WTRU may determine or be configured to send a transmission in the uplink direction using a PUSCH. At 1120, to randomize out-of-cell interference, the WTRU may use a scrambling sequence for transmitting the PUSCH transmission. As shown at 1125, the scrambling sequence generator may be initialized using a TRP identity. Subsequently, at 1130, the WTRU may transmit the PUSCH scrambled using the sequence, e.g., based on the TRP specific identity. A nodeB may receive a PUSCH transmission or transmissions and attempt descrambling.

In some examples, a scrambling sequence generation may be initialized with $$c_{int} = n_{RNTI} + n_{ID} \qquad \text{Equation 9}$$

where $n_{ID} \in \{0, 1, \ldots, 1023\}$ equals the higher-layer parameter dataScramblingIdentityPUSCH if configured and the RNTI equals the C-RNTI, MCS-C-RNTI or CS-RNTI, and the transmission is not scheduled using DCI format 0_0 in a common search space. Otherwise $n_{ID} = N_{ID}^{cell}$. TRP specific $c_{int}$ could be generated by $$c_{int} = n_{RNTI} + n_{ID} \times 1023 + n_{ID}^{panel} \qquad \text{Equation 10}$$

where $n_{ID}^{TRP} = \{0, 1, \ldots, N_{ID}^{TRP}\}$ and $N_{ID}^{TRP} =$ number of TRPs in the cell−1.

Examples provided herein include procedures related to SRS operation. Further, examples provided herein include SRS configuration. In a multi-TRP system, a WTRU equipped with multiple panels may be configured with multiple SRS resources to support assessment of uplink connections over multiple links between WTRU panels and TRPs.

Figure 12:
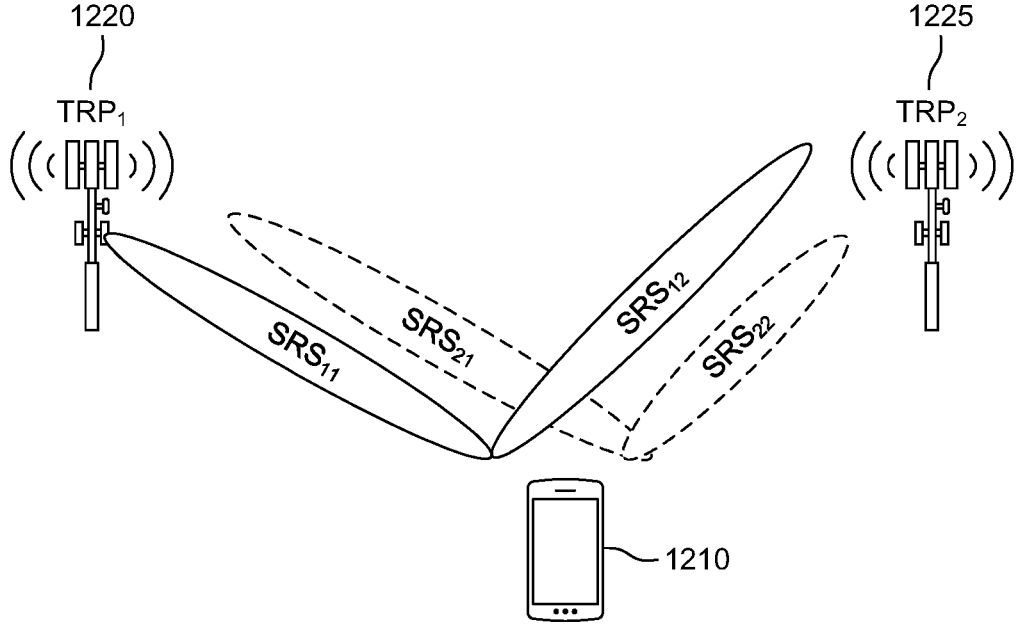
FIG. 12 is a system diagram illustrating an example of a sounding reference signal (SRS) configuration.

FIG. 12 is a system diagram illustrating an example of SRS configuration. As shown in FIG. 12, the configuration may involve a multi-TRP system, which may include a WTRU 1210, a first TRP and a second TRP In FIG. 12, the first TRP and the second TRP are denoted by elements 1220 and 1225, respectively. The WTRU 1210 may have one or multiple antenna panels. The WTRU 1210 may be configured to transmit one or more SRSs to each of TRPs 1220 and 1225. As shown, the WTRU 1210 may transmit multiple SRSs using each antenna panel. For instance, using one antenna panel, the WTRU 1210 may transmit $SRS_{11}$, which may be received by the TRP 1220, and may transmit $SRS_{12}$, which may be received by TRP 1225. Using another antenna panel, the WTRU 1210 may transmit $SRS_{21}$, which may be received by the TRP 1220, and may transmit $SRS_{22}$, which may be received by TRP 1225.

Examples provided herein include SRS scheduling. In some examples, a WTRU may be configured with at least two different sets of SRS resources per TRP per bandwidth part. The SRS transmissions on each TRP may be configured periodically/semi-statically in different slots.

In further examples, the network may configure power control of each SRS resource per TRP independently. In an exemplary solution with two TRPs and a WTRU equipped with two panels, a WTRU may be configured with four independent power control schemes. In some solutions, the state of SRS power control may also be used as a basis for PUSCH transmissions.

The SRS transmissions initiated based on transmission from different WTRU panels may have different power accumulations configured per bandwidth part per TRP. Thus, a WTRU may be configured to perform power control for its SRS transmissions by employing multiple transmit power control (TPC) UP/DOWN commands and TPC power accumulations per bandwidth part per TRP. In an example, an SRS transmission configuration and power control may require TRP-specific TPC commands.

Examples provided herein include one or more power headroom reports (PHRs) for multiple TRPs. This type of PHR calculation may be SRS-based. When a WTRU equipped with multiple panels, configured for uplink transmission in a multi-TRP scenario, is configured to transmit periodic PHR reports, the WTRU may send all type 3 PHRs for each configured panel to one or more TRPs.

In some examples, if a WTRU determines that the PHR is PUSCH-based for a specific TRP, then it may append an SRS-based PHR for the other configured TRPs as a reference for the network.

In some examples, a multi-entry MAC-CE PHR for multiple TRPs may be employed where real SRS transmissions on a type 3 PHR report for one TRP may be combined with virtual type 3 PHR reports for the other configured TRPs. In an additional or alternative example, a real PUSCH type 1 PHR may be combined with virtual SRS type 3 PHRs for the other configured TRPs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit receive unit (WTRU) comprising a processor and a memory, the processor and memory configured to:

receive configuration information associated with a plurality of transmit/receive points (TRPs), the configuration information comprising:

an indication of a first set of reference signals associated with pathloss measurements for a first TRP of the plurality of TRPs, an indication of a second set of reference signals associated with pathloss measurements for a second TRP of the plurality of TRPs, first physical uplink control channel (PUCCH) spatial relation information associated with a third set of reference signals, and second PUCCH spatial relation information associated with a fourth set of reference signals;

determine that a first subset of reference signals are common between the first set of reference signals and the third set of reference signals;

determine that a second subset of reference signals are common between the second set of reference signals and the fourth set of reference signals;

perform measurements on the first subset of reference signals and the second subset of reference signals;

for each of the plurality of TRPs that include at least one reference signal of the first subset of reference signals or at least one reference signal of the second subset of reference signals, determine a pathloss based on the measurements on the first subset of reference signals and the second subset of reference signals;

select a TRP and an associated transmit beam based on the determined pathlosses; and send a PUCCH transmission to the selected TRP using the selected transmit beam.

2. The WTRU of claim 1, wherein the first PUCCH spatial relation information is associated with the first TRP and the second PUCCH spatial relation information is associated with the second TRP.

3. The WTRU of claim 1, wherein the selected transmit beam is associated with an antenna panel of the WTRU.

4. The WTRU of claim 1, wherein the first PUCCH spatial relation information associated with the third set of reference signals corresponds to PUCCH spatial relation information for the first TRP and is associated with a first set of PUCCH resources for PUCCH transmissions to the first TRP, and the second PUCCH spatial relation information associated with the fourth set of reference signals corresponds to PUCCH spatial relation information for the second TRP and is associated with a second set of PUCCH resources for PUCCH transmissions to the second TRP.

5. The WTRU of claim 1, wherein the selected transmit beam corresponds to a selected antenna panel at the WTRU.

6. The WTRU of claim 1, wherein the TRP and associated transmit beam are associated with at least one reference signal in the first subset of reference signals that are common between the first set of reference signals and the third set of reference signals, and the TRP and associated transmit beam are selected based on the at least on reference signal having a lowest pathloss measurement of the first subset of reference signals and the second subset of reference signals.

7. The WTRU of claim 1, wherein the configuration information associated with the plurality of TRPs comprises a first TRP identifier associated with the first TRP and a second TRP identifier associated with the second TRP.

8. The WTRU of claim 1, wherein the processor and the memory are configured to use a default configuration for PUCCH transmissions to the first TRP if there are no common reference signals between the first set of reference signals and the third set of reference signals.

9. A method comprising:

receiving configuration information associated with a plurality of transmit/receive points (TRPs), the configuration information comprising:

an indication of a first set of reference signals associated with pathloss measurements for a first TRP of the plurality of TRPs, an indication of a second set of reference signals associated with pathloss measurements for a second TRP of the plurality of TRPs, first physical uplink control channel (PUCCH) spatial relation information associated with a third set of reference signals, and second PUCCH spatial relation information associated with a fourth set of reference signals;

determining that a first subset of reference signals are common between the first set of reference signals and the third set of reference signals;

determining that a second subset of reference signals are common between the second set of reference signals and the fourth set of reference signals;

performing measurements on the first subset of reference signals and the second subset of reference signals;

for each of the plurality of TRPs that include at least one reference signal of the first subset of reference signals or at least one reference signal of the second subset of reference signals, determining a pathloss based on the measurements on the first subset of reference signals and the second subset of reference signals;

selecting a TRP and an associated transmit beam based on the determined pathlosses; and sending a PUCCH transmission to the selected TRP using the selected transmit beam.

10. The method of claim 9, wherein the first PUCCH spatial relation information is associated with the first TRP and the second PUCCH spatial relation information is associated with the second TRP.

11. The method of claim 9, wherein the selected transmit beam is associated with an antenna panel of the WTRU.

12. The method of claim 9, wherein the first PUCCH spatial relation information associated with the third set of reference signals corresponds to PUCCH spatial relation information for the first TRP and is associated with a first set of PUCCH resources for PUCCH transmissions to the first TRP, and the second PUCCH spatial relation information associated with the fourth set of reference signals corresponds to PUCCH spatial relation information for the second TRP and is associated with a second set of PUCCH resources for PUCCH transmissions to the second TRP.

13. The method of claim 9, wherein the selected transmit beam corresponds to a selected antenna panel at the WTRU.

14. The method of claim 9, wherein the TRP and associated transmit beam are associated with at least one reference signal in the first subset of reference signals that are common between the first set of reference signals and the third set of reference signals, and the TRP and associated transmit beam are selected based on the at least on reference signal having a lowest pathloss measurement of the first subset of reference signals and the second subset of reference signals.

15. The method of claim 9, wherein the configuration information associated with the plurality of TRPs comprises a first TRP identifier associated with the first TRP and a second TRP identifier associated with the second TRP.

16. The method of claim 9, further comprising using a default configuration for PUCCH transmissions to the first TRP if there are no common reference signals between the first set of reference signals and the third set of reference signals.

* * * * *